United States Patent
So et al.

(10) Patent No.: US 7,401,174 B2
(45) Date of Patent: Jul. 15, 2008

(54) FILE SYSTEM DEFRAGMENTATION AND DATA PROCESSING METHOD AND APPARATUS FOR AN INFORMATION RECORDING MEDIUM

(75) Inventors: Hirokazu So, Osaka (JP); Shinji Inoue, Osaka (JP); Makoto Ochi, Osaka (JP); Takuji Maeda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 462 days.

(21) Appl. No.: 11/011,160

(22) Filed: Dec. 15, 2004

(65) Prior Publication Data

US 2005/0231765 A1  Oct. 20, 2005

(30) Foreign Application Priority Data

Dec. 16, 2003  (JP) ............................. 2003-417777

(51) Int. Cl.
*G06F 13/00* (2006.01)
*G06F 15/00* (2006.01)
*G06F 12/00* (2006.01)

(52) U.S. Cl. ........................... 711/4; 711/100; 711/154; 711/170; 358/1.16

(58) Field of Classification Search ................. 711/100, 711/154, 170, 200, 202; 358/1.16
See application file for complete search history.

(56) References Cited

U.S. PATENT DOCUMENTS

| | | | |
|---|---|---|---|
| 5,819,290 A | 10/1998 | Fujita | |
| 6,000,006 A * | 12/1999 | Bruce et al. | 711/103 |
| 6,038,636 A * | 3/2000 | Brown et al. | 711/103 |
| 7,085,879 B2 * | 8/2006 | Aasheim et al. | 711/103 |
| 2003/0065899 A1 * | 4/2003 | Gorobets | 711/165 |
| 2003/0093606 A1 * | 5/2003 | Mambakkam et al. | 710/305 |
| 2003/0133348 A1 * | 7/2003 | Wong | 365/222 |
| 2004/0088513 A1 * | 5/2004 | Biessener et al. | 711/173 |

FOREIGN PATENT DOCUMENTS

| | | |
|---|---|---|
| EP | 1046996 | 10/2000 |
| JP | 8-339318 | 12/1996 |
| JP | 2000-305818 | 11/2000 |
| JP | 2000-322307 | 11/2000 |

OTHER PUBLICATIONS

Kinariwala, Bharat. "9.4: Array of Pointers". Programming in C. 1994. pp. 1-6. http://www-ee.eng.hawaii.edu/~tep/EE150/book/chap9/section2.1.4.html.*

(Continued)

*Primary Examiner*—Tuan V. Thai
(74) *Attorney, Agent, or Firm*—Greenblum & Bernstein, P.L.C.

(57) ABSTRACT

An apparatus and method which can achieve high-speed data processing and long memory life and is effective to elimination of defragmentation of data, for example, is provided. A recording medium includes a logical-physical conversion table for storing correspondence of a logical address to a physical address of a block in a recording region. The recording medium has a function of replacing correspondence of a logical address to a physical address in the logical-physical conversion table, for a set of logical addresses. A data processing apparatus issues a replace command to the recording medium so that data can be rearranged on a consecutive region in the logical address space, thereby eliminating defragmentaion on the logical address space.

13 Claims, 24 Drawing Sheets

OTHER PUBLICATIONS

English Language Abstract of JP 2000-305818.
English Language Abstract of JP 8-339318.
English Language Abstract of JP 2000-322307.
U.S. Appl. No. 10/992,097 to Hirokazu So et al., filed Nov. 19, 2004.

* cited by examiner

140 LOGICAL-PHYSICAL CONVERSION TABLE

| LOGICAL ADDRESS | PHYSICAL ADDRESS |
|---|---|
| L0 | P972 |
| L1 | P424 |
| L2 | P100 |
| L3 | P7 |
| L4 | P205 |
| L5 | P8 |
| L6 | P65 |
| L7 | P30 |
| ... | ... |
| S0 | P507 |
| S1 | P130 |
| S2 | P881 |
| ... | ... |

140 LOGICAL-PHYSICAL CONVERSION TABLE

| LOGICAL ADDRESS | PHYSICAL ADDRESS |
|---|---|
| L0 | P972 |
| L1 | P424 |
| L2 | P100 |
| L3 | P65 |
| L4 | P205 |
| L5 | P8 |
| L6 | P7 |
| L7 | P30 |
| ... | ... |
| S0 | P507 |
| S1 | P130 |
| S2 | P881 |
| ... | ... |

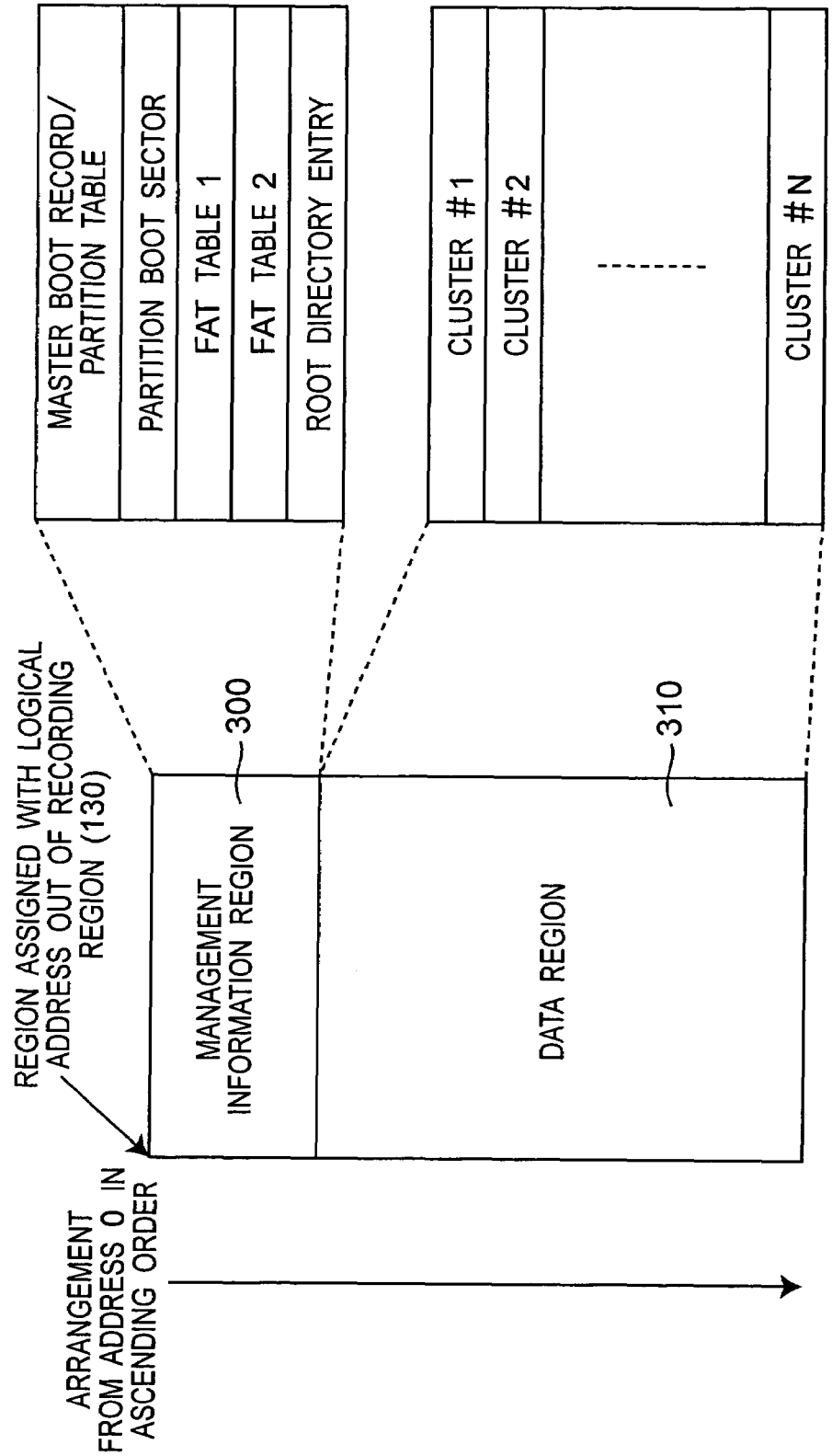

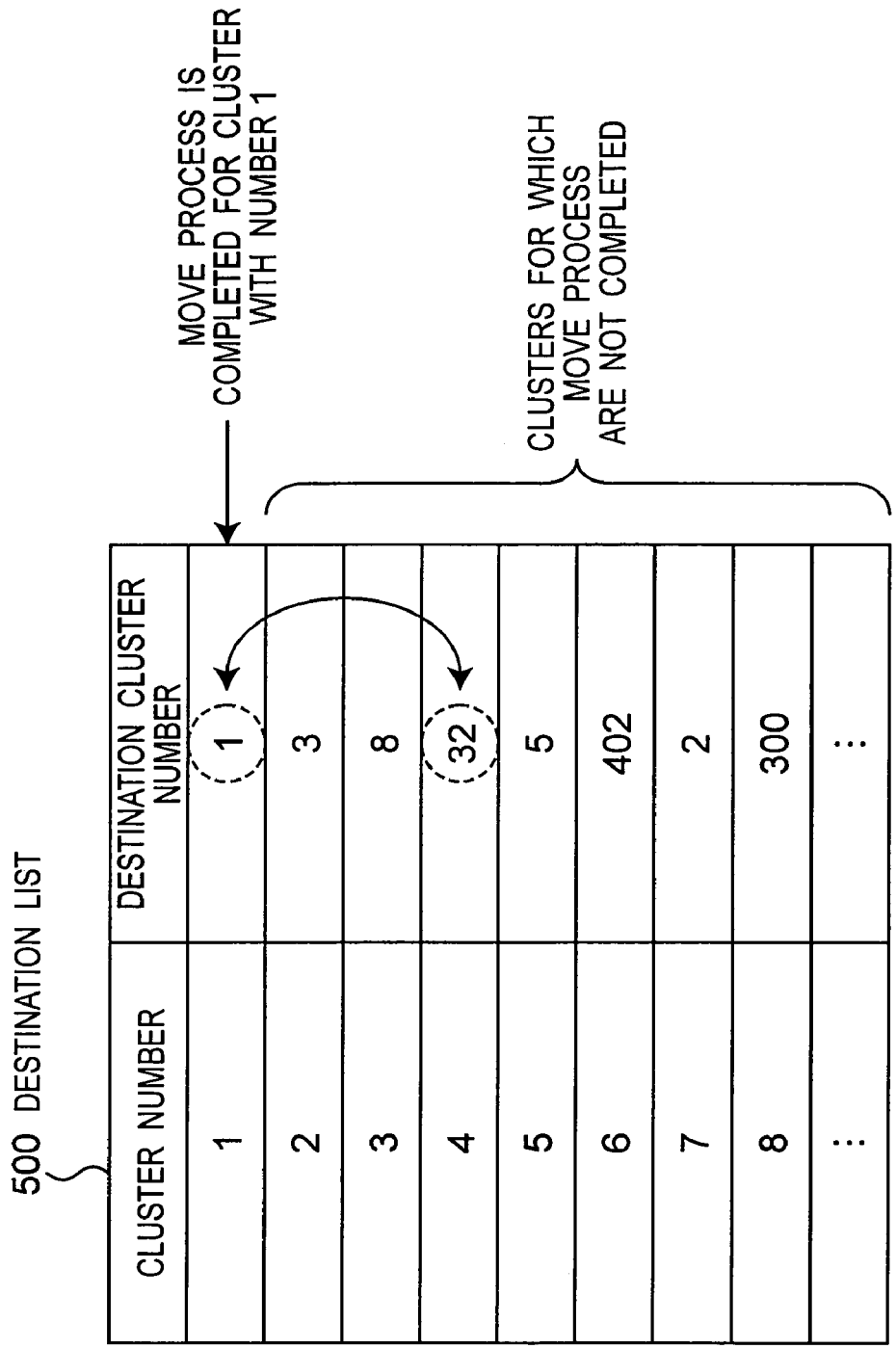

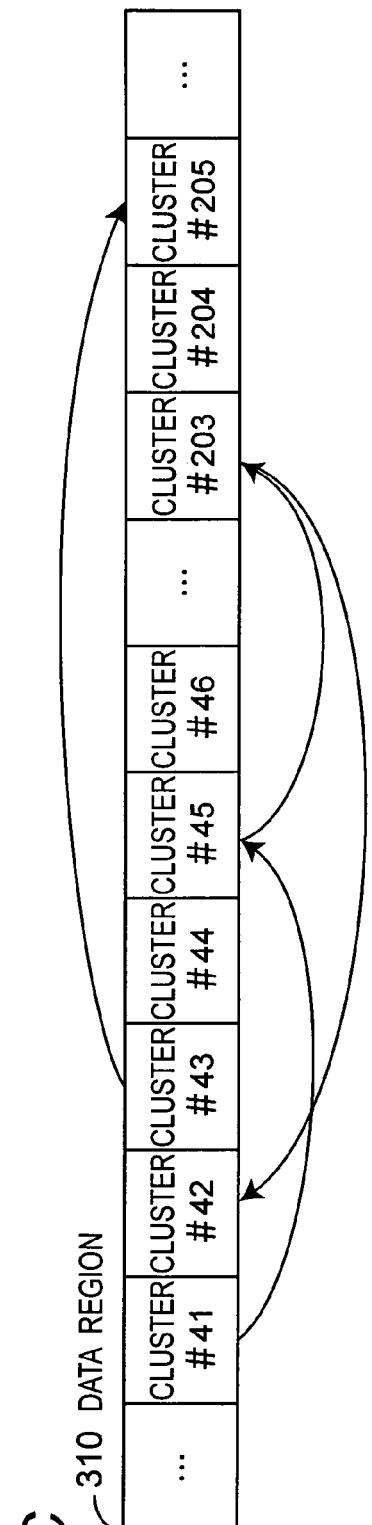

Fig. 15A  500 DESTINATION LIST

| CLUSTER NUMBER | DESTINATION CLUSTER NUMBER |
|---|---|
| ... | ... |
| 41 | 41 |
| 42 | 44 |
| 43 | 45 |
| 44 | 100 |
| 45 | 42 |
| 46 | 203 |
| ... | ... |
| 203 | 43 |
| 204 | 80 |
| 205 | 46 |
| ... | ... |

Fig. 15B  140 LOGICAL-PHYSICAL CONVERSION TABLE

| LOGICAL ADDRESS | PHYSICAL ADDRESS |
|---|---|
| ... | ... |
| L41 | P490 |
| L42 | P225 |
| L43 | P10 |
| L44 | P68 |
| L45 | P69 |
| L46 | P95 |
| ... | ... |
| L203 | P5 |
| L204 | P16 |
| L205 | P339 |
| ... | ... |

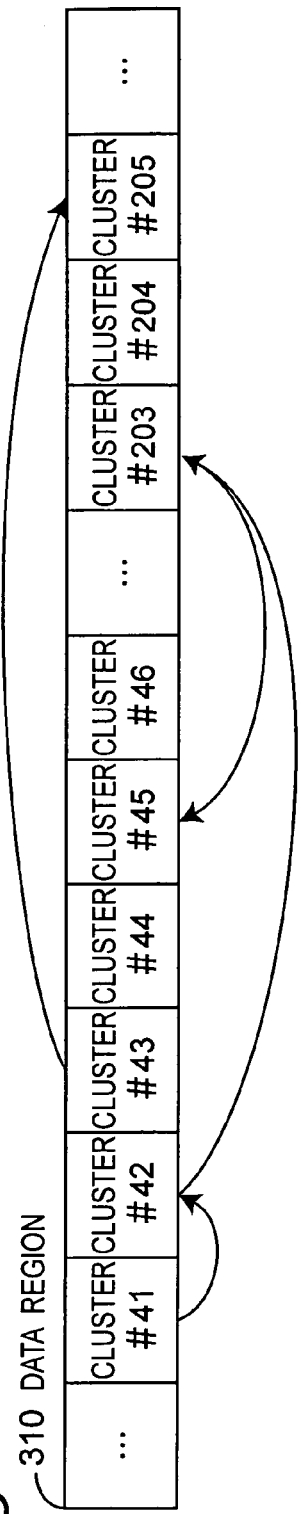

Fig.17A  500 DESTINATION LIST

| CLUSTER NUMBER | DESTINATION CLUSTER NUMBER |
|---|---|
| ⋮ | ⋮ |
| 41 | 41 |
| 42 | 42 |
| 43 | 45 |
| 44 | 100 |
| 45 | 44 |
| 46 | 203 |
| ⋮ | ⋮ |
| 203 | 43 |
| 204 | 80 |
| 205 | 46 |
| ⋮ | ⋮ |

Fig.17B  140 LOGICAL-PHYSICAL CONVERSION TABLE

| LOGICAL ADDRESS | PHYSICAL ADDRESS |
|---|---|
| ⋮ | ⋮ |
| L41 | P490 |
| L42 | P69 |
| L43 | P10 |
| L44 | P68 |
| L45 | P225 |
| L46 | P95 |
| ⋮ | ⋮ |
| L203 | P5 |
| L204 | P16 |
| L205 | P339 |
| ⋮ | ⋮ |

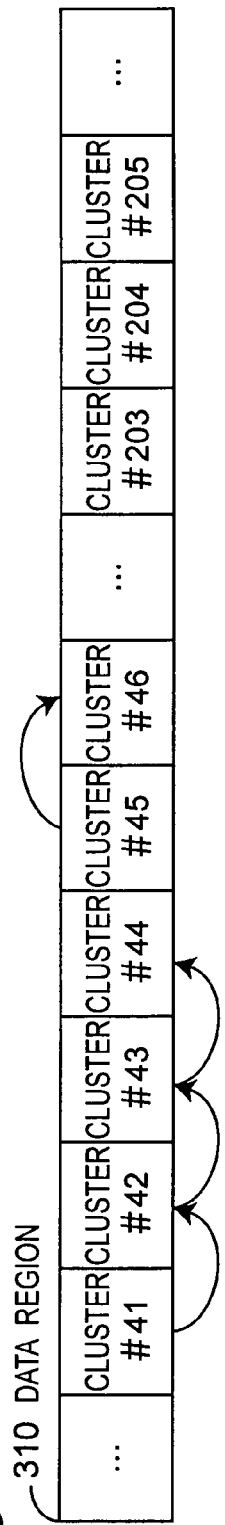

Fig.19A

500 DESTINATION LIST

| CLUSTER NUMBER | DESTINATION CLUSTER NUMBER |
|---|---|
| ... | ... |
| 41 | 41 |
| 42 | 42 |
| 43 | 43 |
| 44 | 44 |
| 45 | 45 |
| 46 | 46 |
| ... | ... |
| 203 | 203 |
| 204 | 204 |
| 205 | 205 |
| ... | ... |

Fig.19B

140 LOGICAL-PHYSICAL CONVERSION TABLE

| LOGICAL ADDRESS | PHYSICAL ADDRESS |
|---|---|
| ... | ... |
| L41 | P490 |
| L42 | P69 |
| L43 | P5 |
| L44 | P225 |
| L45 | P10 |
| L46 | P339 |
| ... | ... |
| L203 | P95 |
| L204 | P76 |
| L205 | P361 |
| ... | ... |

Fig.20A

500 DESTINATION LIST

| CLUSTER NUMBER | DESTINATION CLUSTER NUMBER |
|---|---|
| ... | ... |
| 41 | 41 |
| 42 | 45 |
| 43 | 43 |
| 44 | 100 |
| 45 | 42 |
| 46 | 203 |
| ... | ... |
| 203 | 44 |
| 204 | 80 |
| 205 | 46 |
| ... | ... |

Fig.20B

140 LOGICAL-PHYSICAL CONVERSION TABLE

| LOGICAL ADDRESS | PHYSICAL ADDRESS |
|---|---|
| ... | ... |
| L41 | P490 |
| L42 | P225 |
| L43 | P10 |
| L44 | P68 |
| L45 | P69 |
| L46 | P95 |
| ... | ... |
| L203 | P5 |
| L204 | P16 |
| L205 | P339 |
| ... | ... |

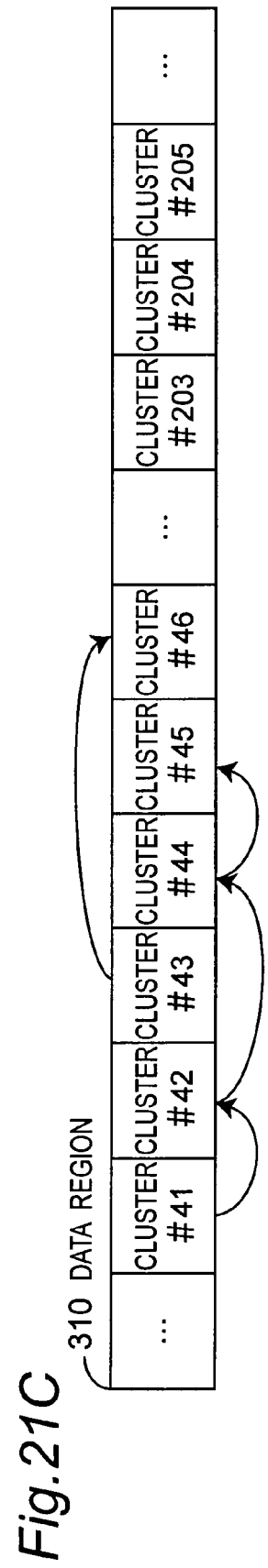

Fig.22A  500 DESTINATION LIST

| CLUSTER NUMBER | DESTINATION CLUSTER NUMBER |
|---|---|
| ... | ... |
| 41 | 41 |
| 42 | 42 |
| 43 | 43 |
| 44 | 44 |
| 45 | 45 |
| 46 | 46 |
| ... | ... |
| 203 | 203 |
| 204 | 204 |
| 205 | 205 |
| ... | ... |

Fig.22B  140 LOGICAL-PHYSICAL CONVERSION TABLE

| LOGICAL ADDRESS | PHYSICAL ADDRESS |
|---|---|
| ... | ... |
| L41 | P490 |
| L42 | P69 |
| L43 | P10 |
| L44 | P5 |
| L45 | P225 |
| L46 | P339 |
| ... | ... |
| L203 | P95 |
| L204 | P76 |
| L205 | P361 |
| ... | ... |

Fig.23

140 LOGICAL-PHYSICAL CONVERSION TABLE

| LOGICAL ADDRESS | PHYSICAL ADDRESS |
|---|---|
| L0~L15 | P16~P31 |
| L16~L31 | P64~P79 |
| L32~L47 | P32~P47 |
| L48~L63 | P0~P15 |
| L64~L79 | P48~P63 |
| L80~L95 | P832~P847 |
| L96~L111 | P112~P127 |
| L112~L127 | P752~P767 |
| ⋮ | ⋮ |
| S0~S15 | P80~P95 |
| S16~S31 | P66~P111 |
| S32~S47 | P528~P543 |
| ⋮ | ⋮ |

FILE SYSTEM DEFRAGMENTATION AND DATA PROCESSING METHOD AND APPARATUS FOR AN INFORMATION RECORDING MEDIUM

BACKGROUND OF THE INVENTION

1. Field of the Invention

The present invention relates to an information recording medium for storing digital data, and a data processing apparatus and data processing method for moving and processing the data stored in the information recording medium.

2. Related Art

As recording media capable of reading and writing digital data, recently, various semiconductor memories are developed and used, such as SD Memory Card (registered trademark), Memory Stick (registered trademark), and Compact-Flash (registered trademark).

Data processing apparatuss for processing data by using these semiconductor memories are widely used in electronic products such as personal computers, audio appliances, video appliances, mobile telephones and digital cameras.

Data stored in semiconductor memory is often managed in file format to specify address and size by using a file system. For example, the SD memory card (registered trademark) is managed by FAT (file allocation table) file system.

In such a case, by repeating writing of files and erasing of files of different sizes many times in the semiconductor memory, the management information of the FAT file system is fragmented. That is, files storing data and vacant regions are present in discrete state in the logical address space. Since the management information is complicated by fragmentation, various problems are caused, such as increase of overhead of file reading, and increase of search time of vacant region for file writing. Some of the semiconductor memories are advanced in speed of write process by writing data in a specific size, but if fragmented, vacant capacity of specific size cannot be assured, and the write process may slow down.

For example, complication of management information by fragmentation causes to lower the processing speed in the following sequence. A data processing apparatus for writing and reading data in a semiconductor memory reads out the information (for example, link information) about the file system of the semiconductor memory to use it on the RAM. Usually, due to limitation of RAM capacity, the data processing apparatus does not load all information of the file system on the RAM, but loads only part of the information of the file system to use it on the RAM. If the information necessary for data access is not present on the RAM, the portion including the necessary information is loaded again. Hence, if the degree of fragmentation is high in the logical address space, when tracing the link information loaded on the RAM, partial information of the file system must be loaded again and again on the RAM, and the processing speed is lowered.

As a method of eliminating such fragmentation, a defragmentation process is proposed for relocating the data so that the data may be disposed in consecutive recording regions (see, for example, patent document 1). In defragmentation process, data of files and vacant regions discrete in the address space are rearranged to be disposed in consecutive regions, and generally it takes a long time in the moving process of data in a physical address space. Besides, the semiconductor memory is generally limited in the number of times of reading and writing, and thus the data relocating process by defragmentation causes to shorten the service life of the semiconductor memory.

Accordingly, a method of starting defragmentation process at an adequate timing (see, for example, patent document 2), and a method of defragmenting the semiconductor memory less frequently (see, for example, patent document 3) have been proposed.

Patent document 1: JP, 2000-305818, A
Patent document 2: JP, 08-339318, A
Patent document 3: JP, 2000-322307, A In the methods of patent documents 2 and 3, when executing the defragmentation process, the data is actually moved to relocate in the physical address space of recording regions of the semiconductor memory. Thus it still takes a substantial time in defragmentation process, and the life of the semiconductor memory may be shortened.

SUMMARY OF THE INVENTION

The invention is intended to solve the above problems, and it is hence an object thereof to present an information recording medium capable of processing data at high speed and of suppressing shortening of memory life, and effective for eliminating fragmentation of data, and a data processing apparatus and data processing method for such information recording medium.

An information recording medium according to the invention is capable of being read and written with data through a data processing apparatus. The recording medium includes a data storage having a recording region for storing data, and operable to store a logical-physical conversion table for storing correspondence of a logical address to a physical address in the recording region, a host interface section operable to communicate with the data processing apparatus, and a control section operable to control the data storage and the host interface section. When receiving a predetermined replace command from the data processing apparatus via the host interface section, the control section replaces the physical addresses corresponding to the logical addresses in the logical-physical conversion table, for plural logical addresses specified by the replace command.

A data processing apparatus according to the invention is an apparatus for reading and writing data from and to the above information recording medium. The apparatus includes a slot operable to load an information recording medium, an input and output section operable to input and output data to and from the information recording medium loaded in the slot, and a data processing section operable to execute a predetermined control including data input and output process in the recording medium through the input and output section. The data processing section has a function of issuing the replace command to the recording medium.

A data processing method according to the invention is a method of moving data stored in an information recording medium which has a recording region for storing data, and stores a logical-physical conversion table for storing correspondence of a logical address to a physical address in the recording region. The method includes replacing physical addresses corresponding to logical addresses in the logical-physical conversion table in the regions before and after movement of data without rewriting the data on the recording region of the information recording medium.

The data processing method may further include generating a destination list which is a list of move destinations determined so that moved data is stored in the consecutive regions in the recording region of the information recording medium, determining regions before and after movement of data according to the destination list in order to eliminate the data fragmentation in the information recording medium, and replacing physical addresses corresponding to the logical addresses on the logical-physical conversion table for the determined regions before and after movement of data.

According to the invention, in the data move process in the information recording medium, without executing rewrite process on the recording regions of data, the data is moved only on the logical-physical conversion table, and data move process can be done at high speed. Since data is not rewritten on the recording regions, shortening of memory life can be suppressed. In particular, by applying the invention when eliminating the fragmentation of data (defragmentation process), the defragmentation process can be executed at higher speed while suppressing shortening of memory life.

BRIEF DESCRIPTION OF THE DRAWINGS

FIG. 7 is a diagram of an example configuration of FAT file system.

FIG. 12 is a diagram of data structure and data example of after completion of move to cluster #1 in the destination list in FIG. 11.

FIGS. 14A to 14C are diagrams of an example of storage of file data in FAT file system.

FIG. 15A is a diagram of an example of the destination list in the example shown in FIGS. 14A to 14C.

FIG. 15B is a diagram of an example of the logical-physical conversion table in the example shown in FIGS. 14A to 14C.

FIGS. 16A to 16C are diagrams of an example of storage of file data after replacement of cluster #42 and cluster #45 in the example shown in FIGS. 14A to 14C.

FIG. 17A is a diagram of an example of the destination list in the example shown in FIGS. 16A to 16C.

FIG. 17B is a diagram of an example of a logical-physical conversion table in the example shown in FIGS. 16A to 16C.

FIGS. 18A to 18C are diagrams of an example of storage of file data after defragmentation process in the example shown in FIG. 14.

FIG. 19A is a diagram of an example of the destination list in the example shown in FIGS. 18A to 18C.

FIG. 19B is a diagram of an example of the logical-physical conversion table in the example shown in FIGS. 18A to 18C.

FIG. 20A is a diagram of example of destination list for executing the defragmentation process so as not to move the file beginning data in the example shown in FIGS. 14A to 14C.

FIG. 20B is a diagram of example of the logical-physical conversion table in the example shown in FIGS. 14A to 14C.

FIGS. 21A to 21C are diagrams of an example of storage of file data after execution of defragmentation process so as not to relocate the file beginning data in the example shown in FIG. 14.

FIG. 22A is a diagram of an example of the destination list in the example shown in FIGS. 21A to 21C.

FIG. 22B is a diagram of an example of the logical-physical conversion table in the example shown in FIGS. 21A to 21C.

FIG. 23 is a diagram of data structure and data example of the logical-physical conversion table in which 16 consecutive physical addresses and logical addresses are assigned in one block.

FIGS. 24A to 24C are diagrams for explaining a command for instructing replacement of three logical addresses at once.

DETAILED DESCRIPTION OF PREFERRED EMBODIMENTS OF THE INVENTION

Figure 1:
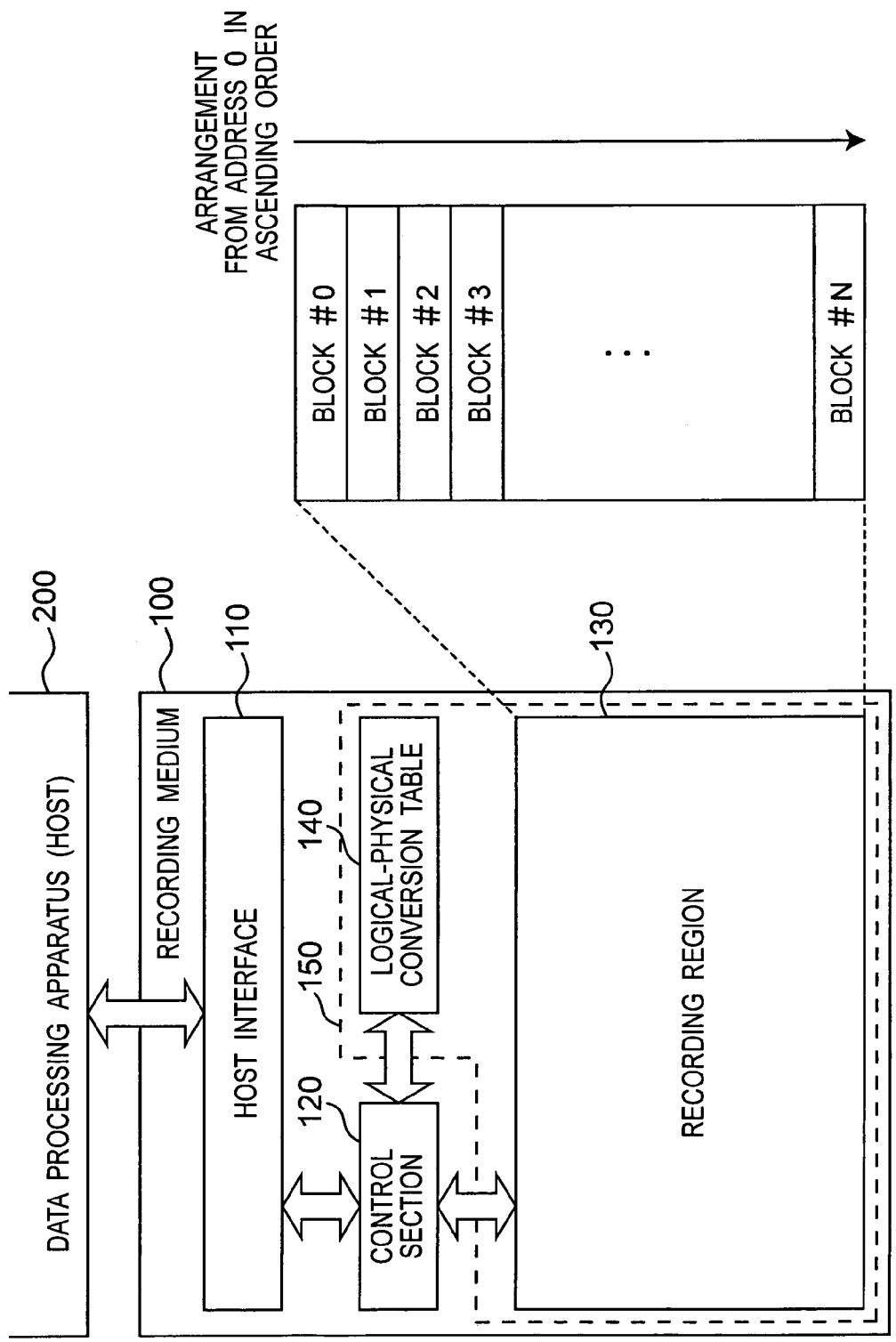
FIG. 1 is a block diagram of an example configuration of an information recording system of the invention.

Preferred embodiments of the invention are described specifically below while referring to the accompanying drawings. An example of information recording system is explained below. FIG. 1 is a block diagram of a example configuration of an information recording system of the invention. As shown in the diagram, the information recording system includes an information recording medium 100 for storing data, and a data processing apparatus 200 for writing or reading data in the recording medium 100. First, the recording medium 100 is specifically described below.

1. Information Recording Medium (Configuration of Information Recording Medium)

As shown in FIG. 1, the recording medium 100 is composed of a host interface section 110, a control section 120, and a data storage 150. The host interface section 110 exchanges information with the data processing apparatus 200 which is a host device for reading, writing the data from/to the recording medium 100, and conducting other control operations.

The control section 120 controls the operation of the recording medium 100, and also controls the host interface section 110 and the data storage 150. The data storage 150 has a recording region 130 and a logical-physical conversion table 140. The recording region 130 is a region for storing digital data from or to which digital data is read or written by the data processing apparatus 200. The recording region 130 is composed of a flash memory of which writing unit is called a "block". The recording region 130 includes plural blocks (blocks #0 to #N). Each block is assigned with a physical address which is an address showing a physical location.

The logical-physical conversion table 140 is a table for converting physical address and logical address of each block of the recording region 130. The "logical address" is an address to be recognized by the data processing apparatus 200 as the host device, and is an address used for reading the data or designating the block to be read. The logical address may be assigned in all blocks, but in this embodiment, logical address is not assigned in some of the blocks. The data processing apparatus 200 cannot designate a block to which logical address is not assigned. The "physical address" is an address in the recording region 130 to be recognized by the control section 120 of the recording medium 100. The control section 120 designates an access region in the actual recording region 130 by using the physical address. The physical address is assigned in all blocks in the recording region 130.

In this embodiment, the FAT file system is used as the file system for managing the size and address of data stored in the region to which the logical address is assigned on the recording medium 100.

When the logical address is specified by the data processing apparatus 200, the control section 120 of the recording medium 100 refers to the logical-physical conversion table 140, and determines the physical address from the logical address, and thereby the block to be accessed in the recording region 130 is determined.

Figure 2:
FIG. 2 is a diagram of data structure and data example of logical-physical conversion table in recording medium.

FIG. 2 is a diagram of data structure and data example of logical-physical conversion table 140. The logical-physical conversion table 140 manages correspondence between the logical address and physical address in each block. In the example in FIG. 2, logical address L0 corresponds to physical address P972, logical address L1 to physical address P424, and logical address L2 to physical address P100.

Further, in blocks existing physically but not assigned with logical address, values of S0, S1, S2 are assigned to corresponding physical addresses (P507, P130, P881, . . . ).

Operation of each section of the recording medium 100 is explained below.

(Data Read Process)

Figure 3:
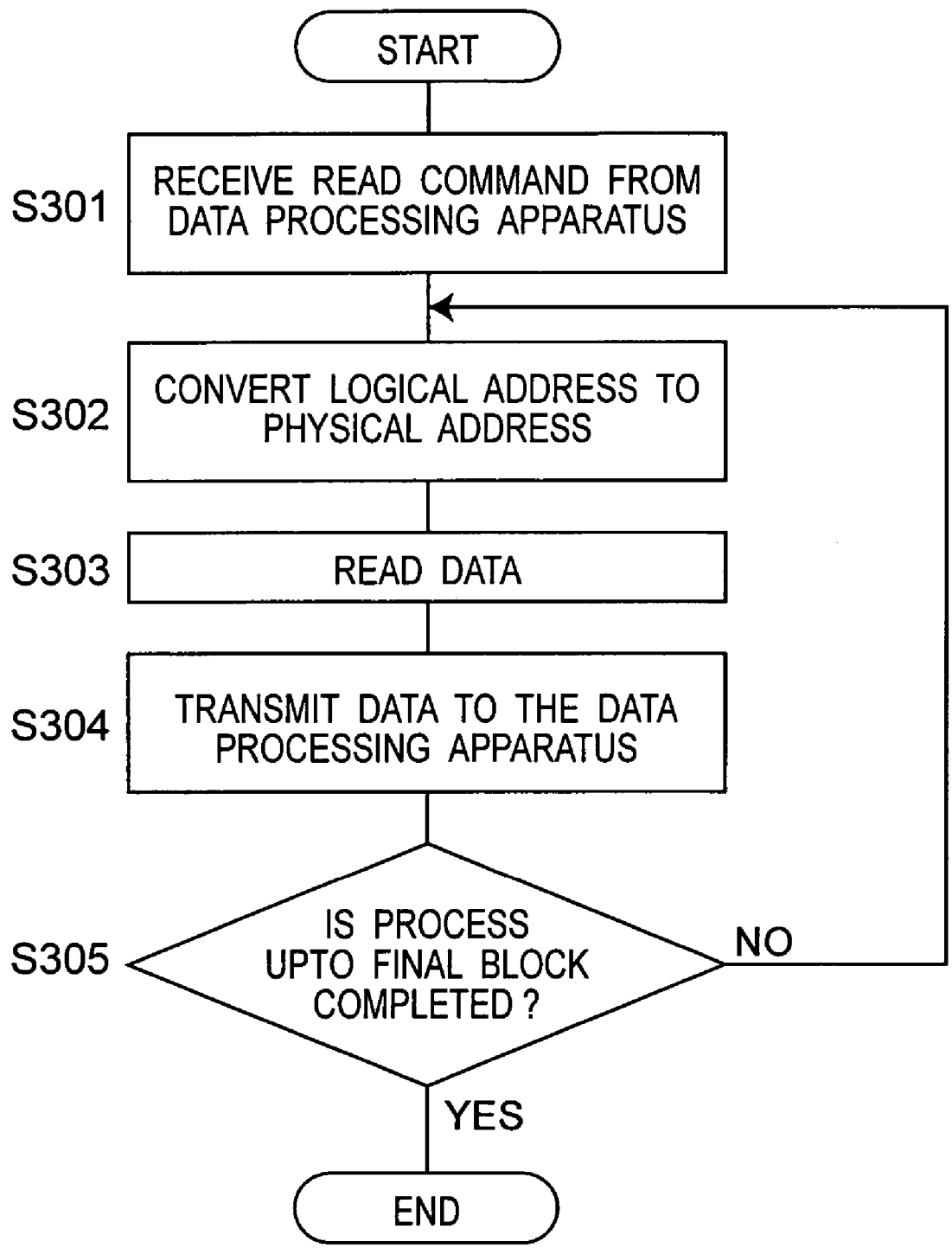
FIG. 3 is a flowchart of an example of operation sequence when the recording medium receives a read command.

FIG. 3 shows operation sequence when the recording medium 100 receives a read command which is a request of reading data, from the data processing apparatus 200.

On receiving a read command from the data processing apparatus 200, the host interface section 110 notifies it to the control section 120 (S301). Herein, the read command is supposed to include at least the logical address and size to be read.

The control section 120 may inform the data processing apparatus 200 by way of the host interface section 110 of the successful reception of read command.

The control section 120 refers to the logical-physical conversion table 140, and determines the physical address corresponding to the logical address specified by the read command received at step S301 (S302).

The control section 120 reads out the data at the determined physical address (S303). The data being read out is transmitted to the data processing apparatus 200 by way of the host interface section 110 (S304).

It is judged whether the data of the size specified by the read command received at step S301 has been completely transmitted to the data processing apparatus 200 (S305). If transmitted completely, the process is terminated. If the transmitted data is not up to the full specified size, 1 is added to the present logical address in order to read out the data stored in next block, and the process goes back to step S302.

(Data Write Process)

Figure 4:
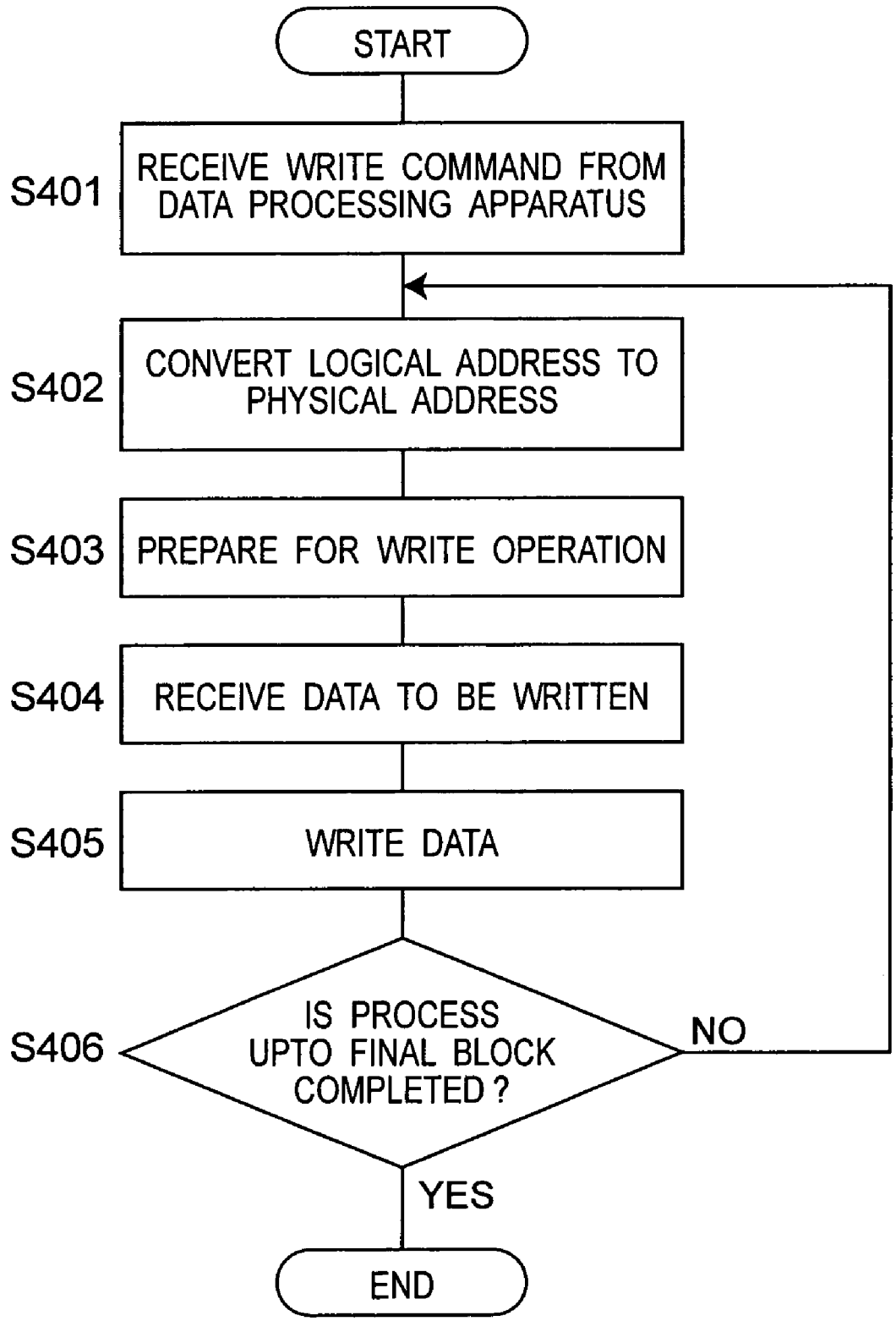
FIG. 4 is a flowchart of an example of operation sequence when the recording medium receives a write command.

FIG. 4 shows operation sequence when the recording medium 100 receives a write command which is a request of writing data, from the data processing apparatus 200. On receiving a write command from the data processing apparatus 200, the host interface section 110 notifies it to the control section 120 (S401). Herein, the write command is supposed to include at least the logical address and size to be written.

The control section 120 may inform the data processing apparatus 200 by way of the host interface section 110 of the successful reception of write command.

The control section 120 refers to the logical-physical conversion table 140, and determines the physical address corresponding to the logical address specified by the write command received at step S401 (S402).

The control section 120 prepares for writing (S403). Herein, the preparation process for writing is, for example, as follows. The flash memory for composing the recording region 130 of the embodiment must be erased before writing. Therefore, the data stored in the physical address calculated at step S402 must be erased in the preparation process.

Alternatively, in order to avoid concentration of writing in a certain block in the flash memory, it may be prepared as follows. That is, in the logical-physical conversion table 140 in FIG. 2, one of the blocks (called "block X") not assigned with logical address such as S0, S1, S2, . . . is erased if not erased. By rewriting the logical-physical conversion table 140, the erased block X is replaced with the block determined at step S402. As a result, the block so far filled with data is now a free block not assigned with logical address, while the block X is assigned with logical address to become a block ready to be written in, so that concentrated writing into a specific block can be avoided.

After the preparation process, the control section 120 receives the data to be written from the data processing apparatus 200 by way of the host interface section 110 (S404). If the size of the data specified by the received write command is larger than the size to be received at once in the recording medium 100, the data is divided into proper size and received plural times. In the embodiment, the size to be received at once is one block of data.

The control section 120 may inform the data processing apparatus 200 by way of the host interface section 110 of the successful reception of data to be written.

The control section 120 writes the data to be written received at step S404 into the block prepared for writing at step S403 (S405).

It is judged whether the data of the size specified by the received write command has been completely received from the data processing apparatus 200 (S406). If received completely, the process is terminated. If the written data is not up to the full size specified by the write command, 1 is added to the present logical address in order to write further data in the next block, and the process goes back to step S402, and the same process (S402 to S405) is repeated.

(Address Replacement Process)

Figure 5:
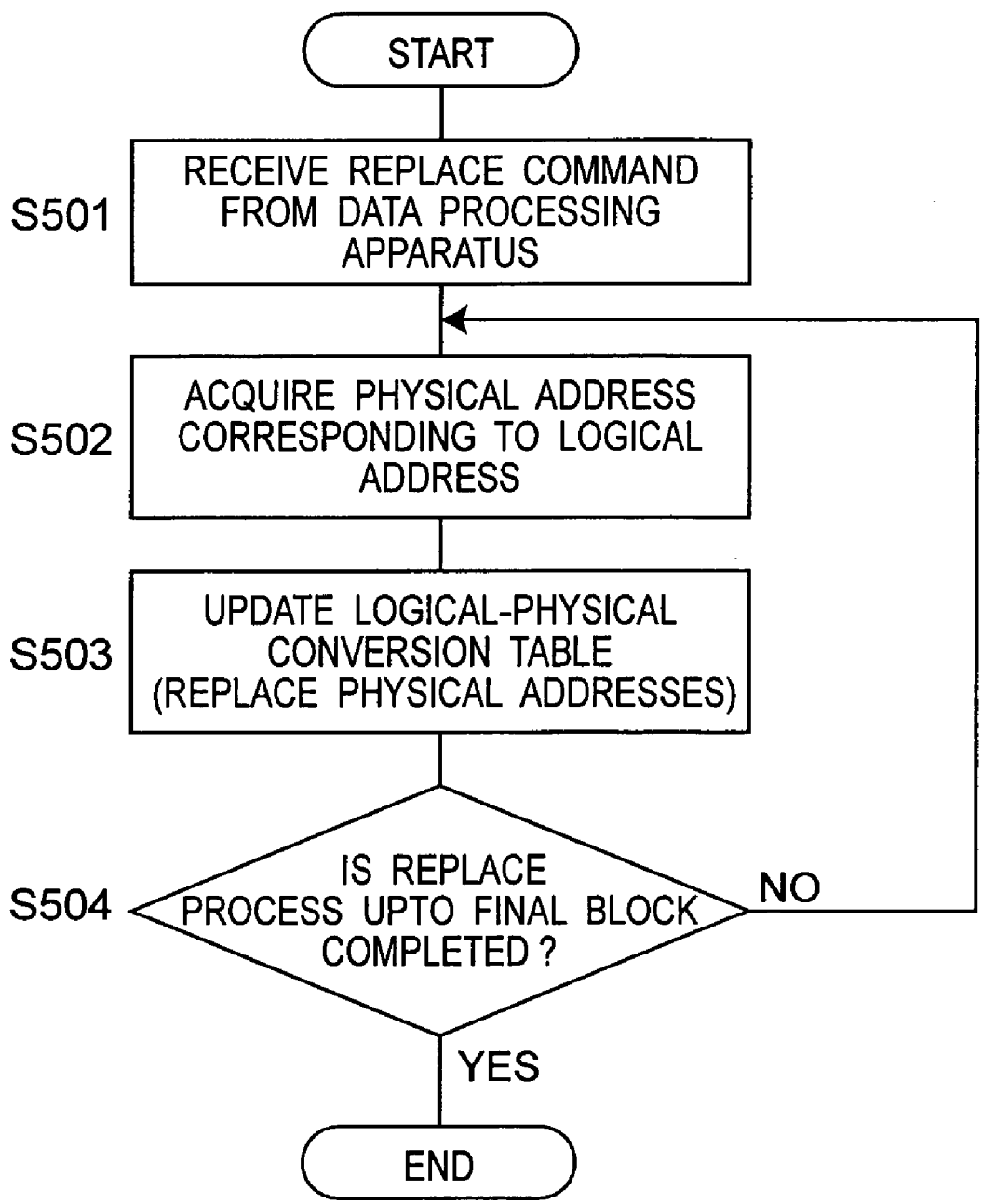
FIG. 5 is a flowchart of an example of operation sequence when the recording medium receives a replace command.

FIG. 5 shows operation sequence when the recording medium 100 receives a logical address replace command of the invention from the data processing apparatus 200. The replace command is a command for instructing replacement of physical addresses corresponding to logical address on the logical-physical conversion table 140 between the logical addresses specified by the command.

On receiving a replace command from the data processing apparatus 200, The host interface section 110 notices it to the control section 120 (S501). Herein, the replace command specifies at least one set of logical addresses to be replaced.

The control section 120 may inform the data processing apparatus 200 by way of the host interface section 110 of the successful reception of the replace command.

The control section 120 refers to the logical-physical conversion table 140, and acquires each physical address corresponding to each address of the set of logical addresses to be replaced (S502). In the logical-physical conversion table 140, mutual values of physical addresses are replaced (S503). At this time, only the physical addresses on the logical-physical conversion table 140 are replaced but data is not moved to different address in a data region 310 shown later in FIG. 7 by reading out from the data region 310.

Figures 6A, 6B:
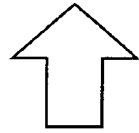
FIGS. 6A and 6B are diagrams of example data of a logical-physical conversion table before and after replacement process.

FIG. 6 shows an example of data of logical-physical conversion table 140 before and after replacement process by the replace command. On the logical-physical conversion table 140 shown in FIG. 6A, when logical address L3 and logical address L6 are replaced, values of physical addresses corresponding to these logical addresses are replaced as shown in FIG. 6B.

Back to FIG. 5, if plural sets of logical addresses are specified in the received replace command, the process at steps S502 and S503 is repeated until replacement is complete (S504) in all sets of logical addresses.

Thus, in the embodiment, to each block of the recording region 130 assigned with logical addresses by the logical-physical conversion table 140, the data processing apparatus 200 can replace the logical address in addition to reading or writing data. In particular, when the replace command is received, the recording medium 100 realizes replacement of data in each block assigned with logical address, not by rewriting the actual data, but by replacing the address information on the logical-physical conversion table 140 only. Thus, since data rewriting in the data region 310 is not needed, process at high speed is realized, and deterioration of memory life can be suppressed.

(FAT File System)

As mentioned above, the embodiment employs the FAT file system for managing the size and address of the data to be stored in the region in which the logical address on the recording medium 100 is assigned. An outline of FAT file system is explained below.

FIG. 7 shows a configuration of FAT file system. In the FAT file system, a management information region 300 is present at the beginning of the logical address in the region assigned with the logical address of the recording region 130, and successively a data region 310 is present for storing the data in the file.

The management information region 300 is composed of a master boot record partition table for storing information for managing by dividing the information recording region into plural regions called partitions, a partition boot sector for storing management information in one partition, FAT table 1 and FAT table 2 showing physical storing positions of data included in the file, a file existing immediately beneath the root directory, and a root directory entry for storing the information of directory. Herein, two FAT table are present because important information is stored and same information is duplicated.

The data region 310 is managed as being divided into plural logical blocks called clusters, and data contained in the file is stored in each cluster. A file storing data of large size uses plural clusters, and linking of clusters is managed by the link information stored in FAT table 1 and FAT table 2.

Referring now to FIG. 8, a more specific example of storing file data by the FAT file system is explained.

Figures 8A, 8B, 8C:
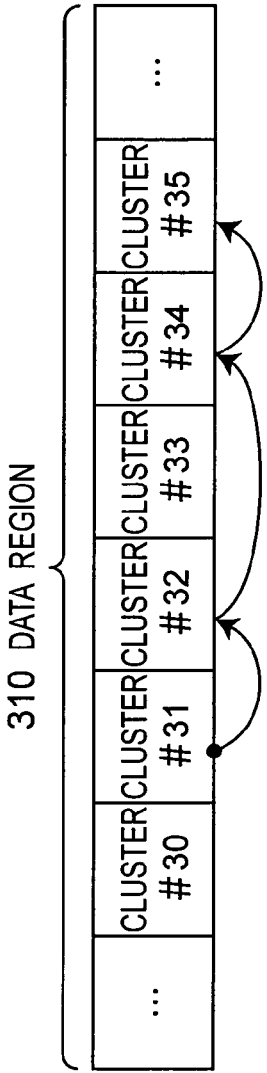
FIGS. 8A to 8C are diagrams of a specific example of storage of file data in FAT file system.

In the root directory entry of management information region 300 or in part of the data region 310, a directory entry 401 for storing file name and file size as shown in FIG. 8A is stored. The data region 310 as the destination of storing of file data is managed in the cluster unit, and each cluster is identified with unique cluster number. To specify the cluster in which file data is stored, the directory entry 401 stores the cluster number (start cluster number) of the cluster for storing the beginning portion of file data. The example of directory entry 401 in FIG. 8A shows that the data of the file named "FILE001.TXT" is stored from cluster number 31.

In the case of a file whose data is stored in plural clusters, the link information is stored in the FAT table. FIG. 8B shows an example of FAT table. The FAT table 402 stores the FAT entry showing the link information of each cluster. The FAT entry stores the cluster number of the cluster to be linked next. In the example in FIG. 8B, since "32" is stored as the FAT entry corresponding to cluster number "31", it is understood that the cluster of cluster number "31" is linked to the cluster of cluster number "32". Similarly, since "34" is stored in the FAT entry corresponding to cluster number "32" and "35" is stored in the FAT entry corresponding to cluster number "34", the clusters are linked in the sequence of cluster numbers "31", "32", "34" and "35". The FAT entry corresponding to cluster number "35" stores "FFF" which means end of the link. Hence, the link starting with cluster number "31" is terminated in four clusters in the numbers of "31," "32," "34," and "35". Therefore, the data in the name of "FILE001.TXT" is stored in the sequence of clusters #31, #32, #34, #35 as shown in FIG. 8C in the data region 310. Meaning of "0" stored in the FAT entry corresponding to cluster number "33" is that the cluster is not assigned in the file, that is, it is a vacant region.

By repeating writing or erasing of files of different sizes, the link information of the FAT entry becomes complicated. That is, individual file data are stored in discrete state in the data region 310. Similarly, vacant regions which are not used are also stored in discrete state. This is called "fragmentation" of data.

To simplify the following explanation, in the embodiment, the cluster is supposed to correspond to the recording region 130 one by one, and the boundary of clusters is supposed to coincide with the boundary of blocks.

2. Data Processing Apparatus

Figure 9:
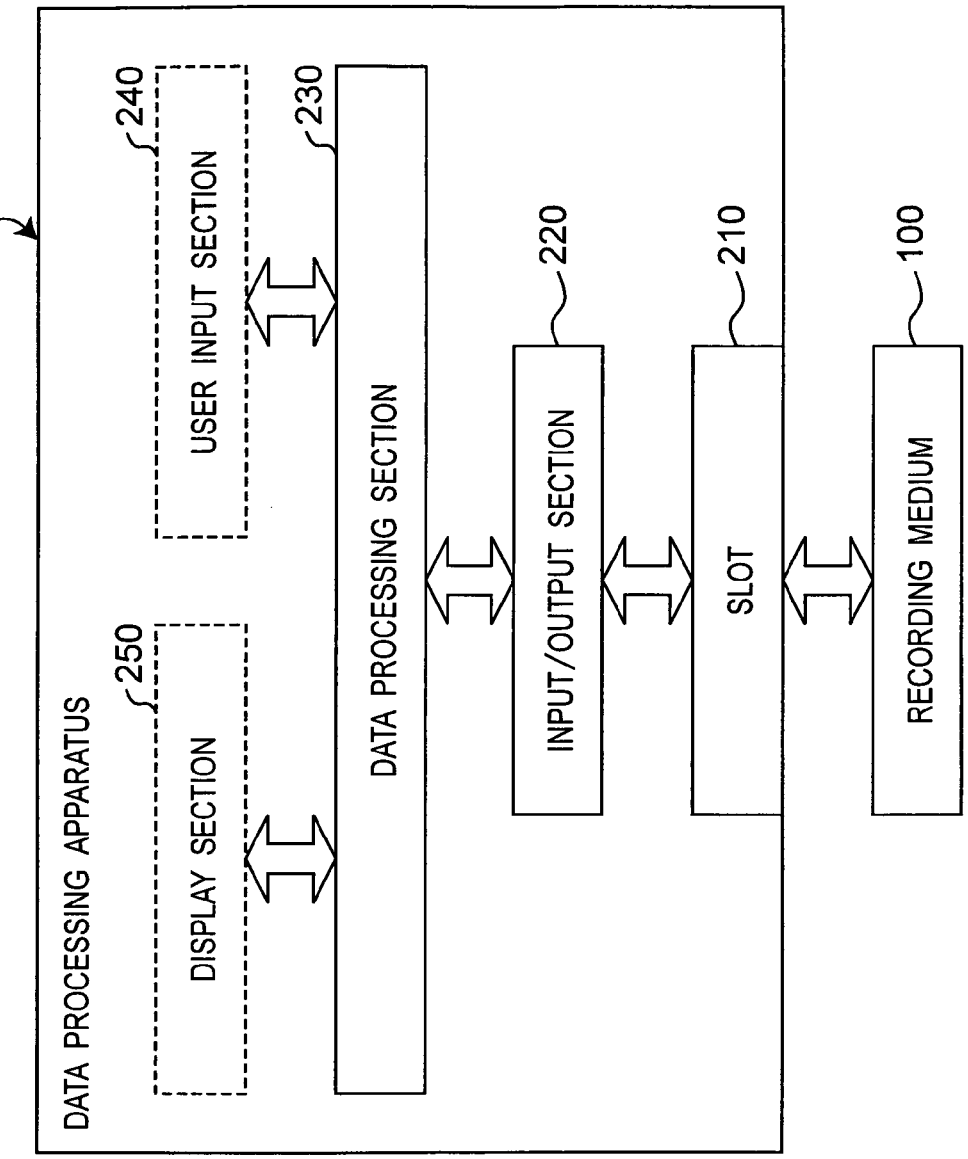
FIG. 9 is a block diagram of an example configuration of a data processing apparatus in the information recording system of the invention.

The data processing apparatus 200 for accessing the recording medium 100 is specifically described below. FIG. 9 is a diagram showing a configuration example of data processing apparatus 200.

The data processing apparatus 200 includes a slot 210, an input and output section 220, a data processing section 230, a user input section 240, and a display section 250.

The slot 210 is a hardware for loading the recording medium 100.

The input and output section 220 exchanges information such as command and data with the recording medium 100 loaded in the slot 210. The input and output section 220 also provides means for issuing a replace command of logical address to the recording medium 100.

The data processing section 230 processes data already stored or data to be stored in the recording medium 100, and is responsible for a main process of the data processing apparatus 200. For example, when the data stored in the recording medium 100 is audio data or video data, the data processing section 230 reads the data by way of the input and output section 220 and reproduces the data. The data processing section 230 also writes the recorded or edited data into the recording medium 100 by way of the input and output section 220. The data processing section 230 provides the following functions by executing the specified program.

In the embodiment, the data processing section 230 has a function of eliminating fragmentation (defragmentation) of data stored in the recording medium 100. That is, the data processing section 230 has means for relocating the data so as to allow the file data discretely stored in the data region 310 of the recording medium 100 to be continuous.

The data processing section 230 has a memory (not shown) as temporary storage region used during processing of data, and can store the data being read out from the recording medium 100.

The user input section 240 receives input from user. The display section 250 informs the user of the processing result of the data processing section 230 or the state of progress of each process. It is noted that in FIG. 9 the user input section 240 and display section 250 are indicated by broken line, which means they are not essential elements.

3. Operation of the Entire System

Operation of the recording medium 100 and each section of the data processing apparatus 200 is specifically described below with reference to the accompanying drawings.

(Defragmentation Process)

Figure 10:
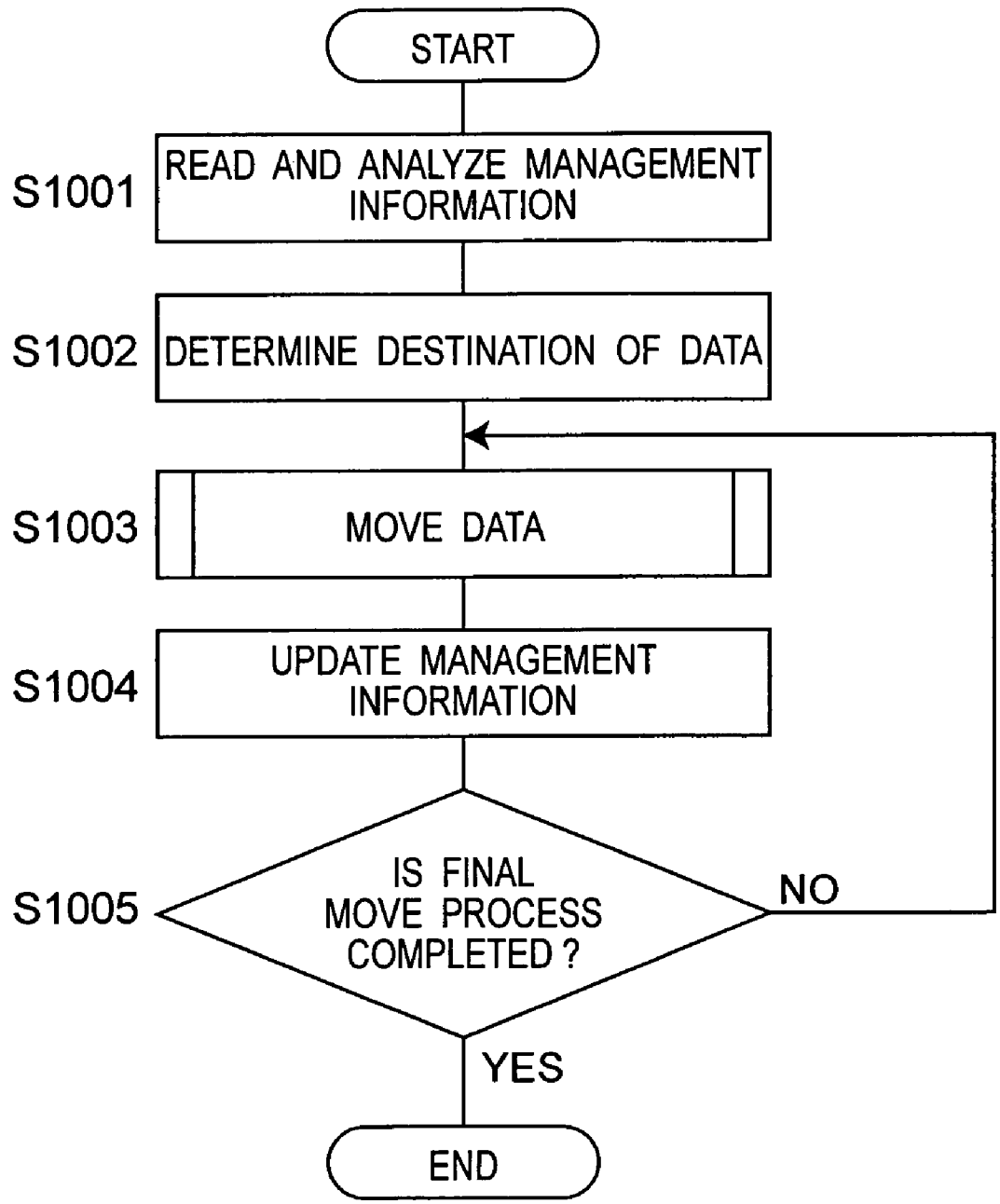
FIG. 10 is a flowchart of operation sequence example of a defragmentation process (process for eliminating fragmentation of data stored in the recording medium) by the data processing apparatus.

FIG. 10 is a diagram showing operation sequence example of the data processing apparatus 200 for a process ("defragmentation process") for eliminating fragmentation of data stored in the recording medium 100.

The data processing section 230 of the data processing apparatus 200 reads out the FAT table and directory entry and so on from the recording medium 100 loaded in the slot 210 by way of the input and output section 220, and analyzes them to collect the information of cluster and others used in each file stored in the data region 310 (S1001).

The data processing section 230 determines the move destination of the data stored in each cluster based on the cluster information used by each file collected (S1002). In this embodiment, the move destination is determined so that all files and vacant regions may be stored in consecutive clusters. The move destination can be determined by known method.

Figure 11:
FIG. 11 is a diagram of data structure and data example of a move destination list.

When determining the move destination at step S1002, the data processing section 230 generates a destination list 500 storing the information of move destinations of data in each cluster on an internal memory of the data processing section 230. FIG. 11 shows a data example of destination list 500. In the example in FIG. 11, the data stored in the cluster of cluster number "1" at the present is stored in the cluster of cluster number "32" after the move, and the data in the cluster of cluster number "2" at the present is to be stored in the cluster of cluster number "3" after move.

According to the destination list 500, the data in each cluster is moved (S1003). In the embodiment, the clusters are determined sequentially from cluster number "1," and the data is moved to the determined cluster. This process is realized by exchange of data between clusters in the logical address space. For example, when relocating the data according to the destination list 500 in FIG. 11, first, the cluster number of which move destination cluster number is "1" is searched. In this case, the cluster number of which move destination cluster number is "1" is number "4." Therefore, the clusters of cluster numbers "1" and "4" are determined as objects of replacement. The data processing section 230 issues a replace command to the recording medium 100 with logical addresses corresponding to cluster number "1" and cluster number "4". The detail of this move process is explained later. Thereafter, the data is moved while the move destination cluster number is sequentially incremented.

As a result of move of cluster data at step S1003, if the information in the FAT table or directory entry is changed, the data processing section 230 updates these values stored in the recording medium 100 (S1004). At this time, the result of move is also reflected in the destination list 500. FIG. 12 shows the result of complete data replacement between data in cluster number "1" and data in cluster number "4" in the destination list 500 in FIG. 11. As a result of the move, the data in cluster number "4" becomes the data which is stored before the move in the cluster of cluster number "1", and its move destination cluster number is "32".

Referring to the destination list 500, it is judged whether the data is moved in all clusters (S1005), and if moved completely, the process is terminated. If data to be moved is still remaining, back to step S1003 to conduct the data move process for the next cluster.

Thus, move process for the data with reference to the destination list 500 allows all files and vacant regions to be rearranged and stored finally in consecutive clusters on the FAT table in the recording medium.

(Move Process of Cluster Data)

The move process of data in the cluster at step S1003 in FIG. 10 is specifically described below by referring to FIG. 13. The following move process is supposed to exchange data between cluster A and cluster B.

Figure 13A:
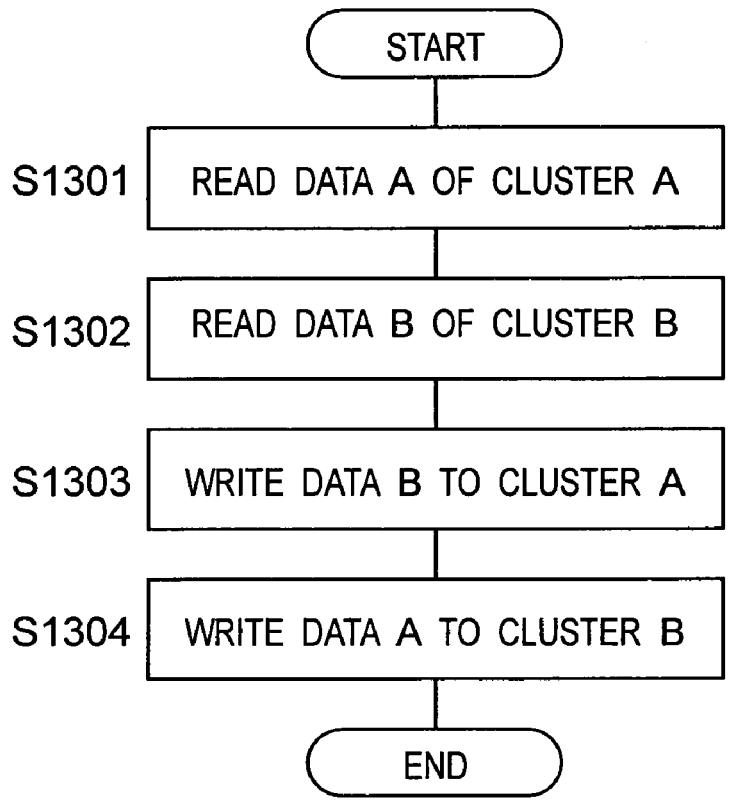
FIG. 13A is a flowchart of operation sequence example of a move process of data of cluster stored in the recording medium by data processing apparatus of prior art.

Prior to explanation of move process of data in the embodiment, a conventional data exchange process is explained by referring to FIG. 13A. In the conventional method, first, data (data A) of cluster A is read out from a recording region in the recording medium and is saved to the memory (S1301). Similarly, data (data B) of cluster B is read out and is saved to the memory (S1302). The logical addresses to be specified on the recording medium for reading out data of cluster A and cluster B are calculated from the information in the management information region or the like. Then, the saved data B of cluster B is written in the position of cluster A (S1303), and the saved data A of cluster A is written in the position of cluster B (S1304).

Figure 13B:
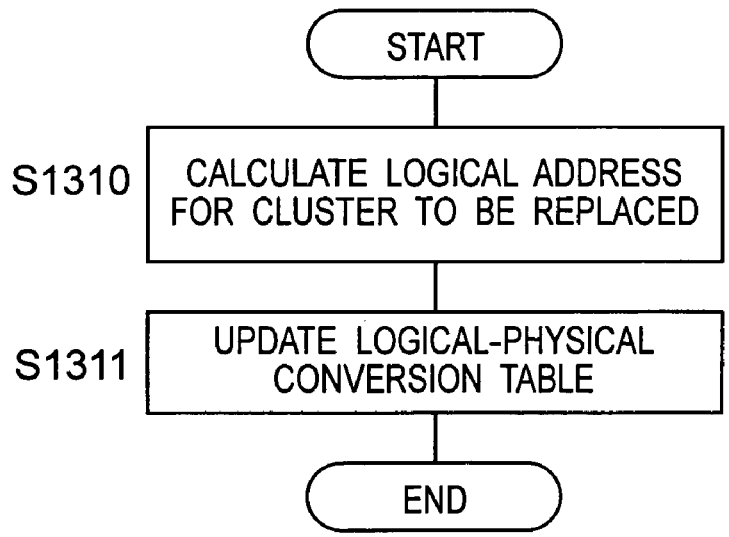
FIG. 13B is a flowchart of operation sequence example of a move process of data of the invention.

Thus, in this conventional data replacement process, the data processing apparatus reads out data of two clusters to be exchanged, and writes data into both clusters. By contrast, in the data move (replacement) process of the embodiment, the data are exchanged only by issuing a replace command of logical addresses. The replace command only updates the logical-physical conversion table 140 in the recording medium 100, but does not write data into the data region. Referring now to FIG. 13B, the detail of data replacement process (step S1003) in the embodiment is described below.

In FIG. 13B, the data processing section 230 calculates the logical addresses of cluster A and cluster B to be replaced from the information in the management information region 300 or the like (S1310).

The data processing section 230 issues a replace command for exchanging the logical address of cluster A and logical address of cluster B, to the recording medium 100 loaded in the slot 210 by way of the input and output section 220 (S1311). When receiving the replace command from the data processing apparatus 200, the recording medium 100 executes the process shown in FIG. 5, and replaces relations of physical addresses and logical addresses corresponding to cluster A and cluster B on the logical-physical conversion table 140.

Thus, the data processing apparatus 200 of the invention, when relocating the data stored in the recording medium 100 during defragmentation process, uses the replace command for instructing replacement of corresponding relation between logical addresses and physical addresses. As a result, the data can be rearranged without writing data into the recording region 130, and defragmentation can be processed at high speed with suppressing shortening of service life of flash memory, and it is very effective. Moreover, being linked consecutively on the FAT by the defragmentation process of the embodiment, the number of times of reloading is decreased when reading out the FAT information onto the RAM of the data processing apparatus 200.

(Specific Examples of Defragmentation Process)

Details of movement of cluster by the defragmentation process are explained below by showing specific examples. In the following explanation, the cluster of cluster number "m" is expressed as "cluster #m." Suppose the data storage state in the recording medium 100 is as shown in FIGS. 14A to 14C. FIG. 14A shows the content of directory entry 401, FIG. 14B shows the content of FAT table 402, and FIG. 14C shows the link state of clusters in the data region 310.

As shown in FIG. 14A, the recording medium 100 stores two files, "FILE100.TXT" and "FILE200.TXT." The "FILE100.TXT" is linked to cluster #41, cluster #45, cluster #203, and cluster #42, and the "FILE200.TXT" is linked to cluster #43 and cluster #205 (see FIGS. 14B and 14C).

FIG. 15A shows an example of destination list 500 generated for defragmentation process in the case shown in FIGS. 14A to 14C. FIG. 15B shows a logical-physical conversion table 140 of the recording medium 100 in the state shown in FIGS. 14A to 14C.

In the data storage state shown in FIGS. 14A to 14C, the data move process to cluster #42 by defragmentation process is explained. The data processing apparatus 200 refers to the destination list 500, and searches for cluster number of which move destination cluster number is "42." In FIG. 15A, the cluster number of which move destination cluster number is "42" is "45," and hence the cluster to be replaced with cluster #42 is known to be cluster #45. The data processing apparatus 200 issues a replace command for replacing cluster #42 and cluster #45 to the recording medium 100. At this time, in the replace command, logical addresses of cluster #42 and cluster #45 are specified as logical addresses. As a result, as shown in FIG. 17B, concerning cluster #42 and cluster #45, physical addresses corresponding to the logical addresses of these clusters are replaced. Further, as shown in FIG. 17A, between cluster #42 and cluster #45, the move destination cluster numbers in the destination list 500 are replaced.

In this way, the corresponding relation between the logical addresses and physical addresses are replaced, and hence the link state between clusters in the logical address space, that is, the data storage state is changed. The data storage state after change is shown in FIGS. 16A to 16C. In this case, as shown in FIG. 16B, in the FAT table 402, FAT entries ("203" and "FFF") corresponding to cluster #42 and cluster #45 are replaced. At the same time, FAT entry contents of cluster #41 and cluster #203 linked to the replacement objects of cluster #42 and #45 are also changed. Specifically, FAT entries of cluster #41 and cluster #203 are changed from "45" and "42" to "42" and "45," respectively. In this case, therefore, four FAT entries are changed in the FAT table 402.

By relocating (rearranging) data by replacement between clusters for all clusters in the above described manner while referring to the destination list 500, finally, the data storage state linked consecutively is obtained as shown in FIGS. 18A to 18C. That is, by relocating the data, as shown in FIGS. 18B and 18C, "FILE100.TXT" is linked to cluster #41, cluster #42, cluster #43, and cluster #44, and "FILE200.TXT" is linked to cluster #45 and cluster #46. Thus defragmentation process allows each file to be managed in consecutive regions on the FAT. Since the beginning cluster of "FILE200.TXT" is cluster #45, the value of the start cluster number of directory entry 401 is also changed from "43" to "45." FIG. 19A and FIG. 19B show the state of the destination list 500 and logical-physical conversion table 140 after defragmentation process.

In this example of defragmentation process, regarding "FILE200.TXT", finally the directory entry 401 is rewritten. A method of moving data so that the directory entry 401 is not rewritten is explained below. In this case, in relocating data, the cluster including the beginning data of file is not moved.

In the data storage state in FIGS. 14A to 14C, at this time, the destination list 500 becomes as shown in FIG. 20A. That is, in the clusters including the beginning data of file, that is, cluster #41 and cluster #43, the cluster number and move destination cluster number are identical. FIG. 20B shows the logical-physical conversion table 140 in this case.

FIG. 21 shows the data storage state after execution of defragmentation process according to the destination list 500 shown in FIG. 20A. FIG. 22A and FIG. 22B respectively show the destination list 500 and logical-physical conversion table 140 corresponding to the data storage state in FIG. 21. In the diagram, cluster #43 including the beginning data of "FILE200.TXT" is not moved, and the clusters excluding this portion are linked consecutively on the FAT.

4. Modified Examples

The concept of the invention is described herein by presenting the preferred embodiment thereof, but it must be noted that the concept of the invention is not limited to the illustrated embodiment alone. Following modified examples are also included in the scope of the invention.

(1) In the embodiment, the logical address and size for reading are stored in the read command, but the size may not be specified in the read command. In this case, the data processing apparatus 200 instructs halt of reading after reading necessary size of data. That is, the data may be read out continuously from the recording medium 100 until the data processing apparatus 200 instructs halt of reading. The reading size may be fixed, or other methods may be employed. The same is true to the write command.

(2) When preparing for writing at step S403 in FIG. 4, it is explained that the logical-physical conversion table 140 may be updated, but the logical-physical conversion table 140 may be updated after completion of data writing process at step S405. At this time, the existing data can be saved as much as possible even if an error occurs in the midst of writing process and the process is interrupted.

It is important for the recording medium of the invention that the medium should have replacing means for logical address regardless of the sequence of reading/writing data.

(3) The embodiment is intended to eliminate fragmentation of data stored in the recording medium 100. The concept of the invention is not limited to this example, and it can be applied in the case of moving the data stored in the recording medium 100 into other addresses in the recording medium 100. In particular, it is effective when moving data of an integer multiple of blocks within the recording region 130.

(4) In the defragmentation process shown in FIG. 10, data is rearranged so that all of files and vacant regions may be stored in consecutive clusters, but only some of the files or vacant regions may be stored in consecutive clusters.

For example, as for streaming data such as video data and audio data, storage of data in the regions of consecutive logical addresses allows the position of the next reproduction data to be easily determined at the time of reproduction. As a result, the processing in the data processing apparatus is lessened, and the power consumption can be saved. Accordingly, fragmentation may be eliminated only in streaming data such as audio data and video data.

A data processing apparatus for recording streaming data may eliminate fragmentation of streaming data automatically after completion of recording of streaming data.

Further, before recording of streaming data, fragmentation of vacant regions may be eliminated by using the replace command of the logical address. As a result, the process of searching for logical address of vacant region during recording of streaming data can be simplified. At this time, it is more effective when the streaming data to be recorded is stored in consecutive regions.

(5) In the defragmentation process shown in FIG. 10, data is rearranged so that all files and vacant regions may be stored in consecutive clusters, and further the data may be erased completely by the erase process in the consecutive vacant regions.

When more blocks are erased, it is not necessary to execute the erase process as preparation for writing, and thus the write process is expected to be advanced in speed.

If vacant regions are fragmented, since the logical address of vacant region to be erased must be specified in each vacant region, and the process is complicated. After making the vacant regions consecutive, it is easy to specify the start address and end address for erase process.

(6) In the embodiment, the recording medium 100 is a semiconductor memory, and the recording region 130 is a flash memory, but the concept of the invention may be similarly applied by using other type of recording medium as far as having the same function as the control section 120 and logical-physical conversion table 140. For example, the recording medium 100 may be a hard disk drive (HDD).

(7) In the embodiment, the cluster as management unit on the FAT and the block as management unit on the logical-physical conversion table 140 correspond to each other one by one, but the invention is also effective if a plurality of blocks correspond to one cluster. In the embodiment, the regions assigned with logical address out of blocks in the recording region 130 of the recording medium are managed by the FAT file system, but other file systems may be used such as NTFS or UDF, or the recording address may be managed without using file system.

When the boundary of managed blocks coincides with the boundary of logical blocks, such as clusters, logical blocks can be replaced by the replace command of the invention. Thus the invention is effective to this case.

(8) In the embodiment, the physical address and logical address are assigned in each block, but the invention is still effective if plural consecutive physical addresses and logical addresses are assigned in one block. FIG. 23 shows data configuration and data example of logical-physical conversion table 140 when consecutive 16 physical addresses and logical addresses are assigned in one block. At this time, the unit of replacing the logical addresses is 16 consecutive logical addresses. That is, the unit of replacement is the block unit of the recording region 130.

(9) In the embodiment, every time the data of cluster is replaced in the defragmentation process in FIG. 10, the FAT information in the FAT table or directory entry in the recording medium 100 is updated. To decrease the number of times of data writing, writing of FAT information into the management information region 300 in the recording medium 100 may be executed in batch after completion of data exchange process of all clusters.

(10) In the embodiment, the writing unit in the recording medium is one block, but an integer multiple of writing units may be defined as one block.

(11) In the embodiment, the recording medium 100 has a function of processing a command for replacing two logical addresses, but it may also have a function of processing a command for replacing three or more logical addresses in batch.

FIGS. 24A to 24C are diagrams explaining the replacement process by a command for replacing three logical addresses. When the data is rearranged from a state in FIG. 24A to a state in FIG. 24C, according to the command for replacing two logical addresses, after exchange of data of logical address L0 and L1 to be set in the state in FIG. 15B, the data of logical address L1 and L2 is replaced again to be set in the state in FIG. 15C. At this time, the recording medium 100 executes plural commands including a command for replacing logical address L0 by logical address L1, and a command for replacing logical address L1 by logical address L2.

By contrast, according to the command for instructing replacement of three logical addresses (herein, L0, L1, L2), by execution of one command, the data in logical address L0 is moved to logical address L2, the data in logical address L1 is moved to logical address L0, and the data in logical address L2 is moved to logical address L1 all at the same time.

(12) In the embodiment, in the defragmentation process in FIG. 10, the data move process is started after move destinations of data stored in all clusters are completely determined, that is, after generation of the destination list 500 of all clusters, but the data move process may be started only after determination of move destinations of some of the data.

In the data move process at step S1003, all data is rearranged by repeating exchange of data between two clusters, but data in two or more clusters may be exchanged at the same time.

(13) In the embodiment, the recording medium 100 has one recording region 130, but may have plural recording regions, and logical-physical conversion tables corresponding to the individual recording regions. At this time, it is arranged so that replacement is possible at lest within each recording region.

For example, a recording medium such as SD memory card has an ordinary region which can be accessed freely by the user, and an authentication region which can be accessed only when succeeding in a specific authentication process. At this time, the recording medium may have two logical-physical conversion tables for ordinary region and validation region, and have a replace command for exchanging data within each recording region.

(14) In the embodiment, the data processing apparatus 200 is supposed to have prior knowledge of size of each block to be replaced by the replace command of the recording medium 100, but the recording medium 100 may have a notice command for informing the data processing apparatus 200 of the size of each block. The data processing apparatus 200 can use the notice command to acquire the size of each block from the recording medium 100.

INDUSTRIAL APPLICABILITY

The invention enables to rearrange the data at high speed in information recording medium. It is hence effective in an application (for example, defragmentation process) of rearranging data frequently in the information recording medium. Moreover, since the invention does not require rewriting of data on the recording medium in data rearranging process, it is particularly effective in the recording medium having a semiconductor memory with number of access times limited.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2003-417777, filed on Dec. 16, 2003, which is expressly incorporated herein by reference in its entirety.

What is claimed is:

1. An information recording medium capable of being read and written with data by a data processing apparatus, comprising:
   a data storage having a recording region for storing data, and operable to store a logical-physical conversion table for storing correspondence of a logical address to a physical address in the recording region;
   a host interface operable to communicate with the data processing apparatus; and
   a controller operable to control the data storage and the host interface,
   wherein, when receiving a replace command from the data processing apparatus via the host interface, the controller replaces the physical addresses corresponding to the logical addresses in the logical-physical conversion table, for plural logical addresses specified by the replace command,
   wherein the host interface resides in the recording medium and is configured to exchange information with a data processing apparatus, and
   wherein the data processing apparatus comprises a host device for reading and writing data to and from the recording medium, and is configured to conduct control operations.

2. The information recording medium of claim 1, wherein the replace command specifies two logical addresses.

3. The information recording medium of claim 1, wherein the recording region is managed in units of clusters by a file system, and the boundary of clusters and the boundary of a data management unit on the logical-physical conversion table coincide with each other.

4. The information recording medium of claim 1, wherein the recording region is divided into plural regions, and each divided region has a logical-physical conversion table, and the correspondence of the logical address to the physical address for plural logical addresses within the logical-physical conversion table can be replaced by the replace command.

5. The information recording medium of claim 4, wherein each divided region includes a region accessible freely by a user, and a region accessible by the user only when authenticated in a specific authentication manner.

6. The information recording medium of claim 1, wherein the controller informs the data processing apparatus of a size of the writing unit into the recording medium or an integer multiple of the size of the writing unit, as a size of the recording region to be replaced when receiving a specified notice command via the host interface.

7. A data processing apparatus for reading and writing data from and to the information recording medium according to claim 1, comprising:
   a slot operable to receive an information recording medium,
   an input and output section operable to input and output data to and from the information recording medium received in the slot; and
   a data processor operable to perform a predetermined control including data input and output processes in the recording medium through the input and output section,
   wherein the data processor is configured to issue the replace command to the recording medium.

8. The data processing apparatus of claim 7, wherein the data processor manages the recording region of the recording medium in units of clusters by a file system, and executes the input and output processes so that the boundary of the cluster and the boundary of a data management unit on the logical-physical conversion table coincide with each other.

9. A data processing method of moving data stored in an information recording medium which has a recording region for storing data, and stores a logical-physical conversion table for storing correspondence of a logical address to a physical address in the recording region, comprising:
   replacing, before and after movement of data, physical addresses corresponding to logically consecutive addresses in the logical-physical conversion table in the region without rewriting the data on the recording region of the information recording medium;
   generating a destination list which is a list of move destinations determined so that moved data is stored in the logically consecutive region in the recording region of the information recording medium;
   determining, before and after movement of data, region according to the destination list in order to eliminate the data fragmentation in the information recording medium; and
   replacing, before and after movement of data, physical addresses corresponding to the logically consecutive addresses on the logical-physical conversion table for the determined regions before and after movement of data.

10. The data processing method according to claim 9, wherein physically erased sectors are produced in unassigned regions after elimination of data fragmentation.

11. The data processing method according to claim 9, wherein, when streaming data is stored in the recording region of the recording medium, the logical addresses in the region storing the streaming data are replaced on the logical-physical conversion table so that the region storing the streaming data is made consecutive in the logical address space.

12. The data processing method according to claim 11, wherein the streaming data includes audio data and/or video data.

13. The data processing method according to claim 9, wherein the replacing to the logical-physical conversion table is performed immediately after recording of audio data and/or video data in the recording region of the information recording medium, so that the audio data and/or video data is recorded in logically consecutive regions.

* * * * *